(12) United States Patent
Ogasahara (10) Patent No.: US 8,964,071 B2
(45) Date of Patent: Feb. 24, 2015

(54) SOLID-STATE IMAGING DEVICE, CAMERA MODULE, AND IMAGING METHOD HAVING FIRST AND SECOND GREEN PIXEL CELLS

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 230 days.

(21) Appl. No.: 13/421,271

(22) Filed: Mar. 15, 2012

(65) Prior Publication Data

US 2012/0314108 A1     Dec. 13, 2012

(30) Foreign Application Priority Data

Jun. 7, 2011 (JP) ................. 2011-127228

(51) Int. Cl.
*H04N 9/07* (2006.01)
*H04N 9/04* (2006.01)
*H04N 9/67* (2006.01)

(52) U.S. Cl.
CPC . *H04N 9/045* (2013.01); *H04N 9/67* (2013.01)
USPC ........................................................ 348/266

(58) Field of Classification Search
CPC .... H04N 19/00315; H04N 9/083; H04N 9/07
See application file for complete search history.

(56) References Cited

U.S. PATENT DOCUMENTS

| | | | |
|---|---|---|---|
| 3,971,065 A | 7/1976 | Bayer | |
| 7,489,346 B2* | 2/2009 | Mizukura et al. | 348/223.1 |
| 7,633,537 B2* | 12/2009 | Hoshuyama | 348/272 |
| 2007/0296840 A1* | 12/2007 | Takada et al. | 348/272 |
| 2011/0069192 A1* | 3/2011 | Sasaki | 348/222.1 |
| 2011/0234863 A1 | 9/2011 | Ogasahara | |
| 2011/0234865 A1* | 9/2011 | Ogasahara | 348/281 |

FOREIGN PATENT DOCUMENTS

| | | |
|---|---|---|
| JP | 2004-289728 | 10/2004 |
| JP | 2007-97202 | 4/2007 |
| JP | 2009-529291 | 8/2009 |
| JP | 2012-511642 | 5/2012 |

OTHER PUBLICATIONS

Japanese Office Action issued Apr. 1, 2014, issued in Japan Patent application 2011-127228 (with English translation).
Office Action issued Jun. 17, 2014 in Japanese Patent Application No. 2011-127228 (with English language translation).

* cited by examiner

*Primary Examiner* — Gary C Vieaux
(74) *Attorney, Agent, or Firm* — Oblon, Spivak, McClelland, Maier & Neustadt, L.L.P.

(57) ABSTRACT

According to embodiments, a solid-state imaging device includes a plurality of pixel cells. The plurality of pixel cells includes a first green pixel cell and a second green pixel cell. The first green pixel cell detects first green light of a first wavelength region. The second green pixel cell detects second green light of a second wavelength region. The second wavelength region includes the first wavelength region. A half-value width of a function representing a spectral sensitivity characteristic of the second green pixel cell is larger than a half-value width of a function representing a spectral sensitivity characteristic of the first green pixel cell.

9 Claims, 5 Drawing Sheets

| G | R |
|---|---|
| B | WG |

FIG.4
PRIOR ART

| G | R |
|---|---|
| B | G |

SOLID-STATE IMAGING DEVICE, CAMERA MODULE, AND IMAGING METHOD HAVING FIRST AND SECOND GREEN PIXEL CELLS

CROSS-REFERENCE TO RELATED APPLICATIONS

This application is based upon and claims the benefit of priority from Japanese Patent Application No. 2011-127228, filed on Jun. 7, 2011; the entire contents of all of which are incorporated herein by reference.

FIELD

The present embodiments typically relate to a solid-state imaging device, a camera module, and an imaging method.

BACKGROUND

Conventionally, an image sensor has employed a so-called Bayer array, in which a red (R) pixel and a blue (B) pixel are arranged at a diagonal angle in a two-row two-column pixel block, and two green (G) pixels are arranged at the other diagonal angle. In addition, conventionally, an image sensor, in which one G pixel in a two-row two-column pixel block is replaced with a white (W) pixel, has been proposed. The W pixel captures white light. In order to realize a high-sensitivity imaging, the W pixel is arranged for the purpose of sufficiently ensuring a signal charge amount of a brightness signal.

Since a W pixel captures light of a broad wavelength region as compared to other color pixels, output saturation with respect to an amount of incident light on a pixel cell occurs before other color pixels. In an image sensor including a W pixel, since output saturation with respect to an amount of incident light occurs in the W pixel, there may be a case that cannot obtain sufficient sensitivity with respect to each color. In addition, since a large amount of light is captured in the W pixel, crosstalk easily occurs due to light leakage from the W pixel to other color pixels adjacent to the W pixel. In the image sensor including the W pixel, the reduction of reproducibility due to the crosstalk has become an issue.

DETAILED DESCRIPTION

According to embodiments, a solid-state imaging device includes an image sensor. The image sensor includes a plurality of pixel cells. The plurality of pixel cells share the detection of each color light. The plurality of pixel cells include a first green pixel cell and a second green pixel cell. The first green pixel cell detects first green light of a first wavelength region. The second green pixel cell detects second green light of a second wavelength region. The second wavelength region includes the first wavelength region. A half-value width of a function representing a spectral sensitivity characteristic of the second green pixel cell is larger than a half-value width of a function representing a spectral sensitivity characteristic of the first green pixel cell.

A solid-state imaging device, a camera module, and an imaging method according to the embodiments will be explained in detail below with reference to the accompanying drawings. The present invention is not limited to these embodiments.

Figure 1:
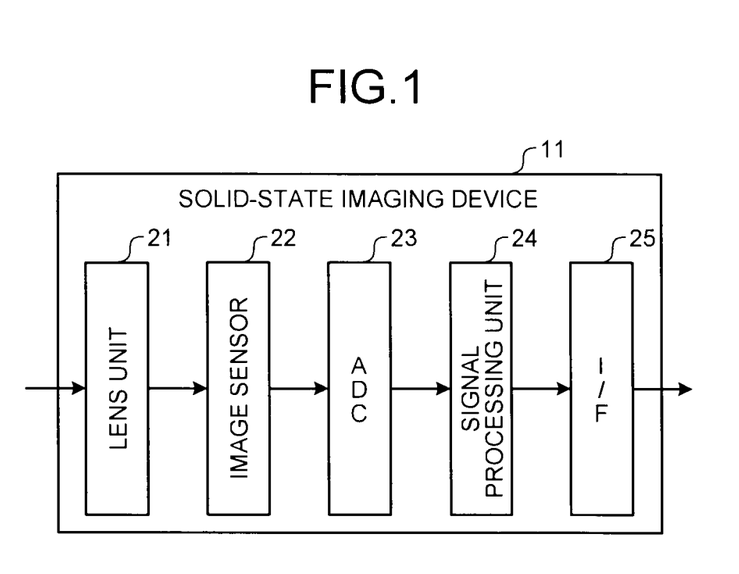
FIG. 1 is a block diagram illustrating a schematic configuration of a solid-state imaging device according to a first embodiment.
Figure 2:
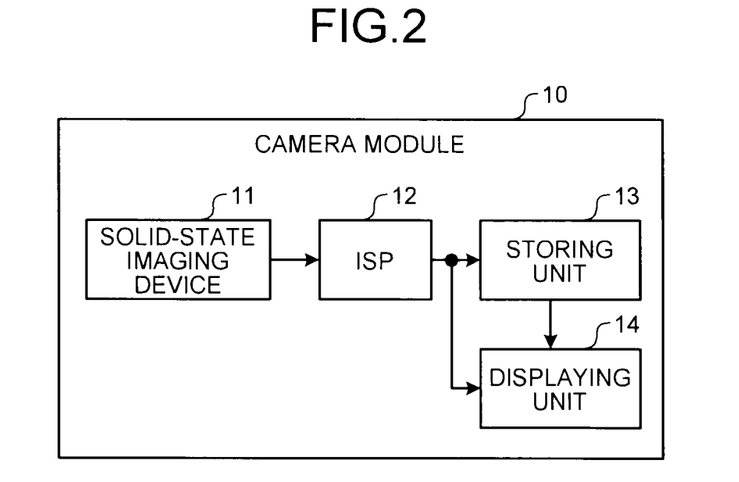
FIG. 2 is a block diagram illustrating a schematic configuration of a camera module including the solid-state imaging device illustrated in FIG. 1.

FIG. 1 is a block diagram illustrating a schematic configuration of a solid-state imaging device according to a first embodiment. FIG. 2 is a block diagram illustrating a schematic configuration of a camera module including the solid-state imaging device illustrated in FIG. 1. A camera module 10 is, for example, a digital camera. The camera module 10 may be electronic devices other than the digital camera, for example, a camera-equipped portable terminal or the like.

The camera module 10 includes a solid-state imaging device 11, an image signal processor (ISP) 12, a storing unit 13, and a displaying unit 14. The solid-state imaging device 11 images a subject image. The ISP 12 performs a signal processing of an image signal obtained by the imaging in the solid-state imaging device 11.

The storing unit 13 stores an image having undergone the signal processing in the ISP 12. The storing unit 13 outputs an image signal to the displaying unit 14 according to a user's manipulation or the like. The displaying unit 14 displays an image according to the image signal input from the ISP 12 or the storing unit 13. The displaying unit 14 is, for example, a liquid crystal monitor.

The solid-state imaging device 11 includes a lens unit 21, an image sensor 22, an analog-to-digital converter (ADC) 23, a signal processing circuit 24, and an interface (I/F) 25. The lens unit 21 captures light from a subject and forms a subject image on the image sensor 22.

The image sensor 22 is, for example, a complementary metal oxide semiconductor (CMOS) image sensor. The image sensor 22 converts light captured by the lens unit 21 into a signal charge, and generates an analog image signal.

The ADC 23 converts the image signal from the image sensor 22 from an analog form to a digital form. The signal processing circuit 24 performs a variety of signal processing on a digital image signal from the ADC 23. The I/F 25 outputs an image signal having undergone the signal processing in the signal processing circuit 24. The I/F 25 may perform a conversion from a serial input to a parallel output, or a conversion from a parallel input to a serial output.

Figure 3:
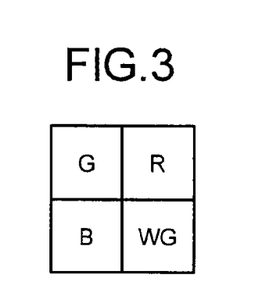
FIG. 3 is a diagram describing a pixel cell array in an image sensor.
Figure 4:
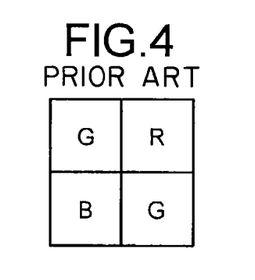
FIG. 4 is a diagram describing a Bayer array.

FIG. 3 is a diagram describing a pixel cell array in the image sensor. FIG. 4 is a diagram describing a Bayer array. In the Bayer array illustrated in FIG. 4, a red (R) pixel and a blue (B) pixel are arranged at a diagonal angle in a two-row two-column pixel block, and two green (G) pixels are arranged at the other diagonal angle.

The image sensor 22 includes a pixel array in which a plurality of pixel cells configured to share the detection of each color light are arranged in an array form. The pixel array of the image sensor 22 includes an R pixel cell configured to detect R light, a B pixel cell configured to detect B light, a G pixel cell configured to detect G light, and a WG pixel cell configured to detect wide green (WG) light.

The G pixel cell is a first green pixel cell. The G pixel cell detects G light that is first green light of a first wavelength region. The WG pixel cell is a second green pixel cell. The WG pixel cell detects WG light that is second green light of a second wavelength region. The second wavelength region includes the first wavelength region.

The R pixel cell includes a color filter configured to selectively transmit the R light. The B pixel cell includes a color filter configured to selectively transmit the B light. The G pixel cell includes a color filter configured to selectively transmit the G light. The WG pixel cell includes a color filter configured to selectively transmit the WG light. The color filters provided in the respective color pixel cells, for example, are configured by dispersing pigments.

The pixel array of the image sensor 22, as illustrated in FIG. 3, is configured to have a two-row two-column pixel block per unit which includes an R pixel cell, a B pixel cell, a G pixel cell, and a WG pixel cell. The R pixel cell and the B pixel cell are located at a diagonal angle of the pixel block, and the G pixel cell and the WG pixel cell are located at the other diagonal angle. The pixel array has a configuration in which one of the two G pixels in the two-row two-column pixel block constituting the Bayer array is replaced with the WG pixel.

Figure 5:
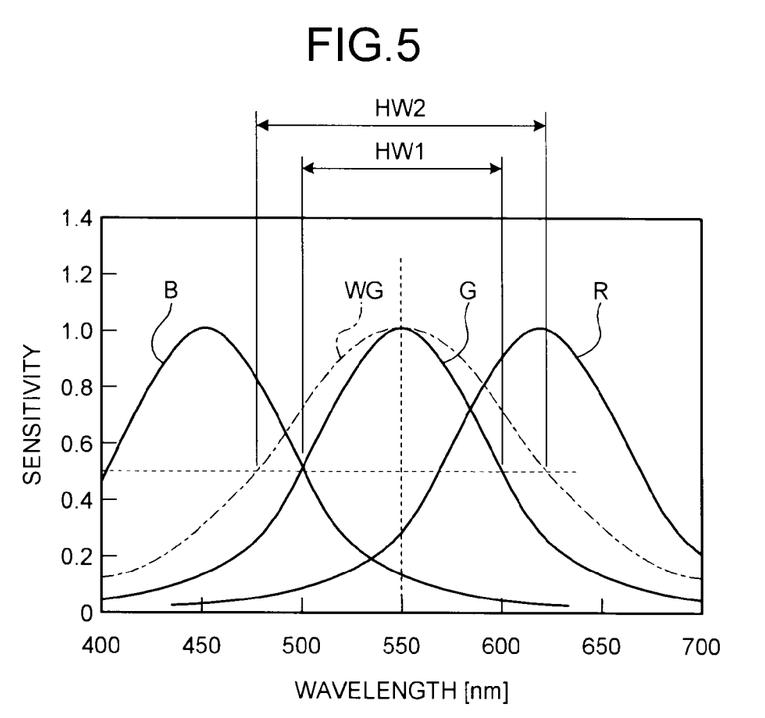
FIG. 5 is a diagram illustrating an example of a spectral sensitivity characteristic that is included in each color light pixel cell.

FIG. 5 is a diagram illustrating an example of a spectral sensitivity characteristic that is included in each color light pixel cell. In an illustrated graph, sensitivity is represented as a vertical axis, and a wavelength is represented as a horizontal axis. The sensitivity represented as the vertical axis is expressed as a relative value, whose maximum sensitivity is 1, for each color light.

The G pixel cell and the WG pixel cell show the maximum sensitivity in the same wavelength. For example, both the G pixel cell and the WG pixel cell show the maximum sensitivity in a wavelength of 550 nm. In addition, a half-value width HW2 of a function representing a spectral sensitivity characteristic of the WG pixel cell is larger than a half-value width HW1 of a function representing a spectral sensitivity characteristic of the G pixel cell.

In addition, it is desirable that a wavelength in which the G pixel cell shows the maximum sensitivity, and a wavelength in which the WG pixel cell shows the maximum sensitivity are substantially equal to each other. It is desirable that the wavelength in which the G pixel cell shows the maximum sensitivity, and the wavelength in which the WG pixel cell shows the maximum sensitivity are within a range of, for example, about ±10 nm, considering the deterioration in color reproducibility and resolution. The half-value width WH2 is set to be larger than the half-value width HW1 by about 50 nm. The image sensor 22 gains the sensitivity as the half-value width HW2 is larger. On the other hand, the color reproducibility is deteriorated. It is preferable that the half-value width HW2 is set considering a balance between the sensitivity and the color reproducibility.

Figure 6:
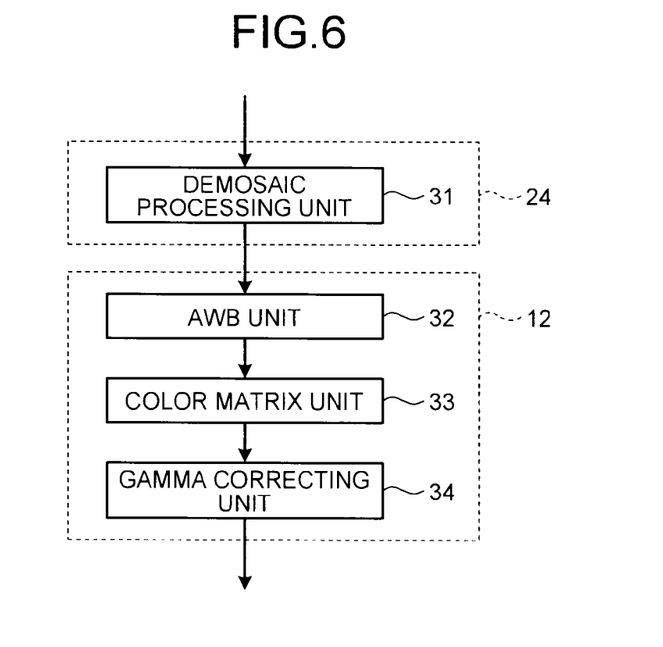
FIG. 6 is a block diagram illustrating a configuration for signal processing in a camera module.

FIG. 6 is a block diagram illustrating a configuration for signal processing in a camera module. The configuration for signal processing in the camera module 10 is divided into a signal processing circuit 24 of a preceding stage and an ISP 12 of a subsequent stage. The signal processing circuit 24 and the ISP 12 function as an image processing apparatus that performs a signal processing of an image signal captured by the image sensor 22.

The signal processing circuit 24 includes a demosaic processing unit 31. The demosaic processing unit 31 generates respective color signals of an R signal, a B signal, a G signal, and a WG signal by a demosaic process to the digital image signal from the ADC 23 (see FIG. 1). The G signal is a first green signal with respect to the first green light. The WG signal is a second green signal with respect to the second green light.

Figure 7:
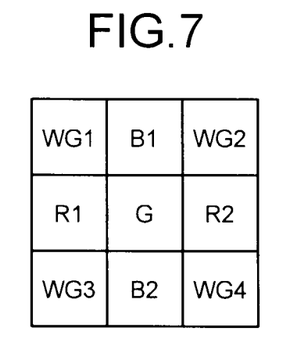
FIG. 7 is a diagram illustrating an example of a pixel in which a demosaic processing unit refers to a signal value in a demosaic process.

FIG. 7 is a diagram illustrating an example of a pixel in which the demosaic processing unit refers to a signal value in the demosaic process. The demosaic processing unit 31 generates a signal value of a deficient color component of each pixel by an interpolation of a signal value of an already-acquired color component of each pixel. Herein, a case that sets the G pixel as a pixel of interest and generates the respective signal values of R, B, and WG will be described as an example. The demosaic processing unit 31 calculates the respective signal values of R, B and WG, which are deficient color components, with respect to the G pixel in which G is set as an already-acquired color component.

In generating a signal value of each color with respect to one pixel of interest, for example, the demosaic processing unit 31 refers to signal values of nine pixels included in a three-row three-column pixel block. The demosaic processing unit 31 calculates the respective signal values, for example, by equations expressed below. In addition, in each equation, the terms "R1", "R2", "B1", "B2", "WG1", "WG2", "WG3", "WG4", and "G" represent signal values of already-acquired color components in R pixels (R1 and R2), B pixels (B1 and B2), WG pixels (WG1, WG2, WG3, and WG4), and a G pixel (G) illustrated in FIG. 7, respectively.

(signal value of $R$)=$(R1+R2)/2$ (signal value of $B$)=$(B1+B2)/2$ (signal value of $WG$)=$(WG1+WG2+WG3+WG4)/4$ (signal value of $G$)=$G$ Even when the R pixel, the B pixel, and the WG pixel are set as the pixels of interest, the demosaic processing unit 31 generates a signal value of a deficient color component by the same calculation as in the case where the G pixel is set as the pixel of interest. The signal processing unit 24 synthesizes a color image composed of the respective color components of R, B, G, and WG by such a demosaic process in the demosaic processing unit 31.

In addition, the demosaic processing unit 31 is not limited to the case that performs the demosaic process by the method described in the embodiment, and the demosaic processing unit 31 may perform the demosaic process by any method. The demosaic processing method, for example, may appropriately perform a modification for improving color reproducibility, a signal-to-noise ratio (SN ratio), resolution, or the like.

The ISP 12 includes an auto white balance (AWB) unit 32, a color matrix unit 33, and a gamma correcting unit 34. The AWB unit 32 performs a white balance adjustment according to a light source with respect to an image signal from the demosaic processing unit 31.

The color matrix unit 33 performs a color matrix arithmetic process on the image signal from the AWB unit 32. The color matrix unit 33 performs the color matrix arithmetic process, for example, by an equation (1) expressed below. In addition, $a_{ij}$ (i=1, 2, 3, j=1, 2, 3, 4) is a correction factor.

$$\begin{pmatrix} R' \\ G' \\ B' \end{pmatrix} = \begin{pmatrix} a_{11} & a_{12} & a_{13} & a_{14} \\ a_{21} & a_{22} & a_{23} & a_{24} \\ a_{31} & a_{32} & a_{33} & a_{34} \end{pmatrix} = \begin{pmatrix} R \\ G \\ B \\ WG \end{pmatrix} \quad (1)$$

The color matrix unit 33 generates new color signals for three colors (R, G, B) from color signals for four colors (R, G, B, and WG) by the multiplication of a three-row four-column color matrix. In the equation, R' is a newly generated R signal value. G' is a newly generated G signal value. B' is a newly generated B signal value. The color matrix unit 33 simultaneously performs a conversion from the R signal, the G signal, the B signal, and the WG signal to the R' signal, the G' signal, and the B' signal, and a process for improving the color reproducibility.

The gamma correcting unit 34 performs a gamma correction for correcting an image gradation with respect to the image signal from the color matrix unit 33. The ISP 12 outputs a color image synthesized in this way. In addition, the processing by the signal processing circuit 24 and the ISP 12 described in the embodiment is one example. The signal processing circuit 24 and the ISP 12 may be appropriately modified, like the addition of other processing, and so on.

The solid-state imaging device 11 ensures high color reproducibility by using a G pixel cell that enables G light to be detected with high chroma. In addition, by using a WG pixel cell that has a low chroma but has a high sensitivity as compared to the G pixel cell, the solid-state imaging device 11 enables a high-sensitivity imaging as compared to a case that employs a typical Bayer array. The WG pixel cell is difficult to cause output saturation or crosstalk as compared to the white (W) pixel cell. The solid-state imaging device 11 can suppress the reduction of sensitivity caused by the output saturation or the reduction of color reproducibility caused by the crosstalk, as compared to the case that applies the W pixel cell.

In the WG pixel cell and the G pixel cell, by setting the wavelengths showing the maximum sensitivity to be substantially equal to each other, the WG pixel cell can obtain information having a certain degree of correlation with respect to data of the G component. The solid-state imaging device 11 can obtain a lot of information with respect to the G component, as compared to a case that uses a pixel cell detecting other color light (for example, "X"), whose peak wavelength is completely different from G as well as R, G, and B. For this reason, the solid-state imaging device 11 can suppress the degradation of resolution for the G component. In addition, the solid-state imaging device 11 can suppress the generation of color moiré (false color) by using WG close to G, as compared to a case that uses X in a color synthesis to R, G, and B.

Furthermore, a color filter used for the WG pixel cell can be obtained by using the same pigment as a color filter used for the G pixel cell and changing a film thickness. As compared to a case where the development of pigment is newly required for a color filter configured to selectively transmit X light, the color filter used for the WG pixel cell can be easily obtained.

In addition, the color filter provided in each pixel cell of the solid-state imaging device 11 is not limited to the case that includes the pigment, but, for example, may be configured using an inorganic material. The color filter, for example, may be configured by laminating an inorganic material, for example, $SiO_2$, $TiO_2$, or the like.

Each configuration from the demosaic processing unit 31 to the gamma correcting unit 34 illustrated in FIG. 6 may be provided in at least one of the signal processing circuit 24 and the ISP 12. For example, the demosaic processing unit 31 may be provided in the ISP 12. All or part of the AWB unit 32, the color matrix unit 33, and the gamma correcting unit 34 may be provided in the signal processing circuit 24.

Figure 8:
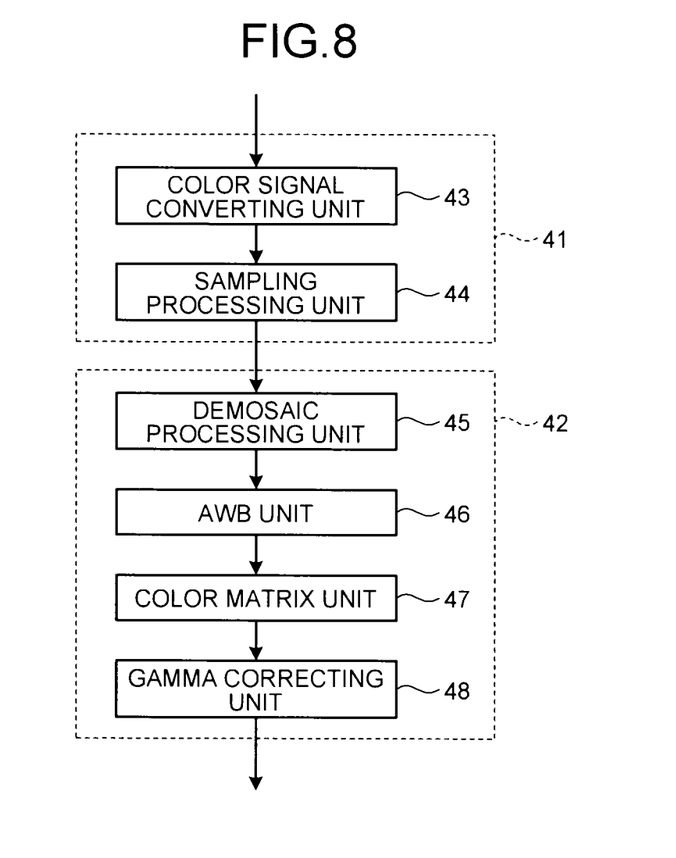
FIG. 8 is a block diagram illustrating a configuration for signal processing in a camera module according to a second embodiment.

FIG. 8 is a block diagram illustrating a configuration for signal processing in a camera module according to a second embodiment. The same reference numerals are assigned to the same parts as the first embodiment, and the redundant description will not be repeated.

A signal processing circuit 41 is provided as a substitute for the signal processing circuit 24 of the first embodiment (see FIG. 1). An ISP 42 is provided as a substitute for the ISP 12 of the first embodiment (see FIG. 2). A configuration for signal processing in the camera module 10 is divided into the signal processing circuit 41 of a preceding stage and the ISP 42 of a subsequent stage. The signal processing circuit 41 and the ISP 42 function as an image processing apparatus that performs a signal processing of an image signal captured by the image sensor 22.

The signal processing circuit 41 includes a color signal converting unit 43 and a sampling processing unit 44. The color signal converting unit 43 converts color signals for four colors (R, G, B, and WG) into new color signals for three colors (R, G, and B). The signal conversion in the color signal converting unit 43 aims at the digital image signal from the ADC 23 (see FIG. 1). The color signal converting unit 43, for example, distributes a WG signal value, at a preset ratio, into respective color components of G with respect to a position of the WG pixel, and R and B with respect to positions adjacent to the WG pixel. By providing the color signal converting unit 43, the solid-state imaging device 11 can output a RAW image composed of the respective color components of R, G, and B.

The sampling processing unit 44 performs a sampling process such that the R signal, the G signal, and the B signal having undergone the conversion in the color signal converting unit 43 become the order corresponding to the Bayer array. By providing the color signal converting unit 43 and the sampling processing unit 44, the solid-state imaging device 11 can output the same image signal as the conventional solid-state imaging device employing the Bayer array.

The ISP 42 includes a demosaic processing unit 45, an AWB unit 46, a color matrix unit 47, and a gamma correcting unit 48. The demosaic processing unit 45 performs a demosaic process on the R signal, the G signal, and the B signal transferred in the order of the Bayer array. The AWB unit 46 performs a white balance adjustment according to a light source with respect to an image signal from the demosaic processing unit 45.

The color matrix unit 47 performs a color matrix arithmetic process on the image signal from the AWB unit 46. The color matrix unit 47 performs a process for improving color reproducibility by the multiplication of a three-row three-column color matrix. The gamma correcting unit 48 performs a gamma correction for correcting an image gradation with respect to the image signal from the color matrix unit 47. The ISP 42 outputs a color image synthesized in this way.

According to the embodiment, the ISP 42 is enabled to divert the ISP that can be combined with the conventional solid-state imaging device employing the Bayer array. Since the camera module 10 can use the ISP 42 that is versatile and inexpensive, costs can be suppressed. In the embodiment, as with the first embodiment, the solid-state imaging device 11 can realize high color reproducibility and high sensitivity by the application of the WG pixel.

In addition, the processing by the signal processing circuit 41 and the ISP 42 described in the embodiment is one example. The signal processing circuit 41 and the ISP 42 may be appropriately modified, like the addition of other processing, and so on. Each configuration from the color signal converting unit 43 to the gamma correcting unit 48 illustrated in FIG. 8 may be appropriately replaced between the signal processing circuit 41 and the ISP 42.

Figure 9:
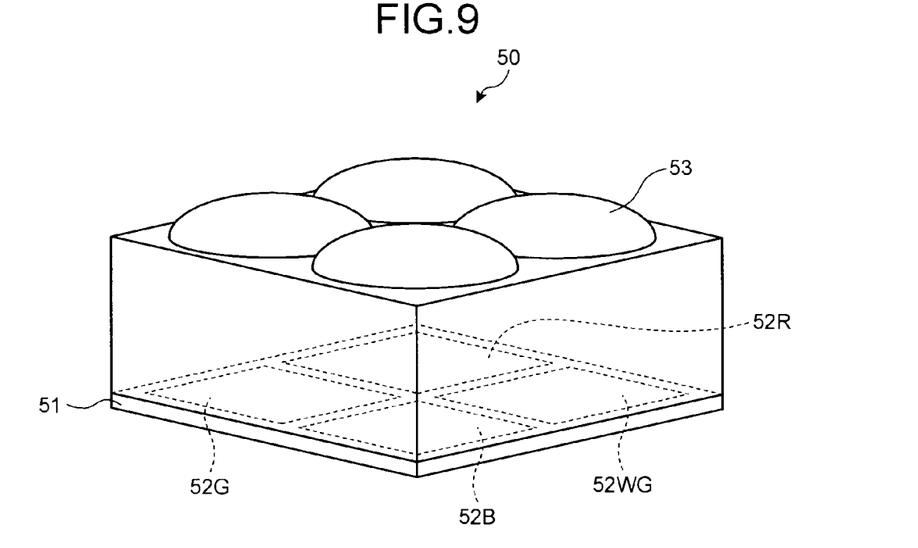
FIG. 9 is a schematic perspective view of a solid-state imaging device according to a third embodiment.

FIG. 9 is a schematic view of a solid-state imaging device according to a third embodiment. The description that is redundant with the first embodiment will not be repeated. A solid-state imaging device 50 includes an image sensor 51 and four imaging lenses 53. The respective imaging lenses 53 constitute two-row two-column lenslets. The respective imaging lenses 53 constitute a lens unit configured to capture light from a subject.

Figure 10:
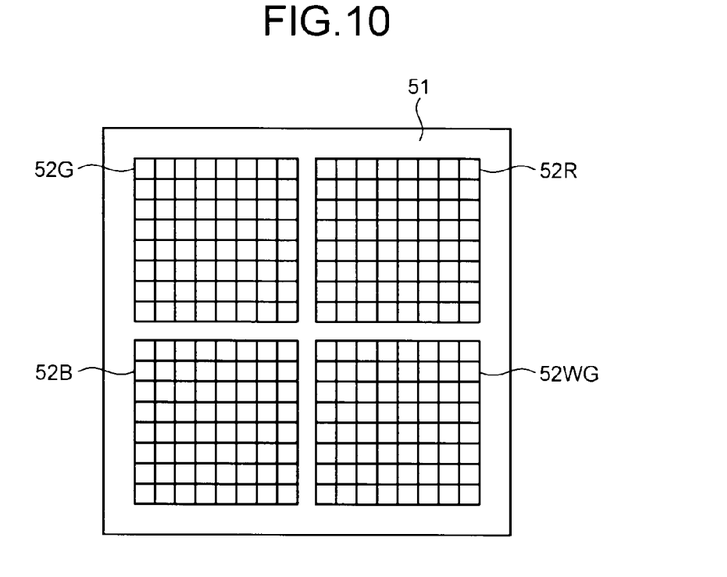
FIG. 10 is a schematic top view of an image sensor.

FIG. 10 is a schematic top view of an image sensor. The image sensor 51 includes an R pixel array 52R, a B pixel array 52B, a G pixel array 52G, and a WG pixel array 52WG. In addition, in the respective pixel arrays 52R, 52B, 52G and 52WG, only light-receiving surfaces are illustrated, and other configurations are not illustrated.

In the R pixel array 52R, R pixel cells are arranged in an array form. In the B pixel array 52B, B pixel cells are arranged in an array form. In the G pixel array 52G that is a first green pixel array, G pixel cells are arranged in an array form. In the WG pixel array 52WG that is a second green pixel array, WG pixel cells are arranged in an array form.

In the image sensor 51, the R pixel array 52R, the B pixel array 52B, the G pixel array 52G, and the WG pixel array 52WG form a two-row two-column matrix. In addition, the imaging lenses 53 are provided corresponding to the R pixel array 52R, the B pixel array 52B, the G pixel array 52G, and the WG pixel array 52WG.

The camera module 10 can synthesize a color image composed of the respective color components of R, B, G and WG, without undergoing the demosaic process, by the respective color signals captured by the respective pixel arrays 52R, 52B, 52G and 52WG. After the synthesis of the color image, as with the first embodiment, the camera module 10 performs the color matrix arithmetic process, the white balance adjustment, and the gamma correction. As with the solid-state imaging device 11 of the first embodiment (see FIG. 1), the solid-state imaging device 50 can realize high color reproducibility and high sensitivity by the application of the WG pixel.

By providing the pixel array of each color component to the image sensor 51, the solid-state imaging device 50 can avoid crosstalk caused by leakage of color light among the pixel cells. By the suppression of crosstalk, the solid-state imaging device 50 can considerably improve color reproducibility and sensitivity. In addition, by enabling the use of the imaging lenses 53 whose design is optimized for each color component, the solid-state imaging device 50 can significantly reduce axial chromatic aberration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
an image sensor including a plurality of pixel cells configured to share detection of each color light;
a signal processing circuit configured to perform a signal processing of an image signal captured by the image sensor,
wherein the plurality of pixel cells includes a first green pixel cell configured to detect first green light of a first wavelength region, and a second green pixel cell configured to detect second green light of a second wavelength region,
the second wavelength region includes the first wavelength region, and
a half-value width of a function representing a spectral sensitivity characteristic of the second green pixel cell is larger than a half-value width of a function representing a spectral sensitivity characteristic of the first green pixel cell,
wherein the pixel cells in the image sensor are arranged in an array form as a pixel array,
the pixel array is configured to have a two-row two-column pixel block per unit which includes a red pixel cell configured to detect red light, a blue pixel cell configured to detect blue light, the first green pixel cell, and the second green pixel cell, and
the red pixel cell and the blue pixel cell are located at a diagonal angle of the pixel block, and the first green pixel cell and the second green pixel cell are located at the other diagonal angle,
wherein the signal processing circuit includes a color signal converting unit configured to convert respective color signals, which include a first green signal with respect to the first green light detected by the first green pixel cell, and a second green signal with respect to the second green light detected by the second green pixel cell, into a green signal, a red signal, and a blue signal, and
the color signal converting unit distributes the second green signal, at a preset ratio, into a green component with respect to a position of the second green pixel cell, and a red component and a blue component with respect to positions adjacent to the second green pixel cell.

2. The solid-state imaging device according to claim 1, wherein a wavelength in which the first green pixel cell shows maximum sensitivity, and is substantially equal to a wavelength in which the second green pixel cell shows maximum sensitivity are within a range of ±10 nm.

3. The solid-state imaging device according to claim 1, wherein the signal processing circuit includes a sampling processing unit configured to perform a sampling process that the red signal, the green signal, and the blue signal having undergone the conversion in the color signal converting unit become the order corresponding to a Bayer array.

4. A camera module comprising:
a solid-state imaging device configured to capture a subject image;
a processor configured to perform a signal processing of an image signal captured by the solid-state imaging device,
wherein the solid-state imaging device includes an image sensor including a plurality of pixel cells configured to share detection of each color light, the plurality of pixel cells include a first green pixel cell configured to detect first green light of a first wavelength region, and a second green pixel cell configured to detect second green light of a second wavelength region, the second wavelength region includes the first wavelength region, and a half-value width of a function representing a spectral sensitivity characteristic of the second green pixel cell is larger than a half-value width of a function representing a spectral sensitivity characteristic of the first green pixel cell, wherein the pixel cells in the image sensor are arranged in an array form as a pixel array, the pixel array is configured to have a two-row two-column pixel block per unit which includes a red pixel cell configured to detect red light, a blue pixel cell configured to detect blue light, the first green pixel cell, and the second green pixel cell, and the red pixel cell and the blue pixel cell are located at a diagonal angle of the pixel block, and the first green pixel cell and the second green pixel cell are located at the other diagonal angle, wherein the processor includes a color signal converting unit configured to convert respective color signals, which include a first green signal with respect to the first green light detected by the first green pixel cell, and a second green signal with respect to the second green light detected by the second green pixel cell, into a green signal, a red signal, and a blue signal, and the color signal converting unit distributes the second green signal, at a preset ratio, into a green component with respect to a position of the second green pixel cell, and a red component and a blue component with respect to positions adjacent to the second green pixel cell.

5. The camera module according to claim 4, wherein a wavelength in which the first green pixel cell shows maximum sensitivity and is substantially equal to a wavelength in which the second green pixel cell shows maximum sensitivity are within a range of ±10 nm.

6. The camera module according to claim 4, wherein the processor includes a sampling processing unit configured to perform a sampling process that the red signal, the green signal, and the blue signal having undergone the conversion in the color signal converting unit become the order corresponding to a Bayer array.

7. An imaging method comprising:

in an image sensor, detecting first green light of a first wavelength region by using a first green pixel cell included in a plurality of pixel cells configured to share detection of each color light;

in the image sensor, detecting second green light of a second wavelength region by using a second green pixel cell included in the plurality of pixel cells, wherein the second wavelength region includes the first wavelength region, and a half-value width of a function representing a spectral sensitivity characteristic of the second green pixel cell is larger than a half-value width of a function representing a spectral sensitivity characteristic of the first green pixel cell, and performing a color signal conversion to convert respective color signals, which include a first green signal with respect to the first green light detected by the first green pixel cell, and a second green signal with respect to the second green light detected by the second green pixel cell, into a green signal, a red signal, and a blue signal, wherein, by the color signal conversion, the second green signal is distributed, at a preset ratio, into a green component with respect to a position of the second green pixel cell, and a red component and a blue component with respect to positions adjacent to the second green pixel cell.

8. The imaging method according to claim 7, wherein a wavelength in which the first green pixel cell shows maximum sensitivity, and is substantially equal to a wavelength in which the second green pixel cell shows maximum sensitivity are within a range of ±10 nm.

9. The imaging method according to claim 7, further comprising:

performing a sampling process that the red signal, the green signal, and the blue signal having undergone the color signal conversion become the order corresponding to a Bayer array.

\* \* \* \* \*